United States Patent
Lo et al.

(10) Patent No.: US 8,413,487 B2
(45) Date of Patent: Apr. 9, 2013

(54) COMPRESSOR PRESSURE MEASURING DEVICE

(75) Inventors: Chi-Hung Lo, Lujhu Township (TW); Mau-Jia Chen, Lujhu Township (TW); Chien-Hsing Yang, Taichung (TW)

(73) Assignee: Heng Sheng Precision Tech Co., Ltd., Lujhu Township (TW)

( * ) Notice: Subject to any disclaimer, the term of this patent is extended or adjusted under 35 U.S.C. 154(b) by 315 days.

(21) Appl. No.: 12/984,865

(22) Filed: Jan. 5, 2011

(65) Prior Publication Data

US 2012/0168008 A1 Jul. 5, 2012

(51) Int. Cl.
*G01M 3/04* (2006.01)
(52) U.S. Cl. .......................... 73/40.7; 73/49.7
(58) Field of Classification Search ............. 73/37, 40.7, 73/49.7, 865.9
See application file for complete search history.

(56) References Cited

U.S. PATENT DOCUMENTS

| | | | |
|---|---|---|---|
| 6,685,054 B2 * | 2/2004 | Kameyama | 222/63 |
| 2008/0216560 A1 * | 9/2008 | Ridgway et al. | 73/40.5 R |
| 2011/0200465 A1 * | 8/2011 | Cho et al. | 417/410.1 |

* cited by examiner

*Primary Examiner* — John Fitzgerald
*Assistant Examiner* — David Z Huang
(74) *Attorney, Agent, or Firm* — Wang Law Firm, Inc.; Li K. Wang; Stephen Hsu (57) ABSTRACT

A compressor pressure measuring device drives a compressor to operate for measuring its pressure. A positive pressure pipeline and a negative pressure pipeline are connected to the entry end and the exit end of the compressor, respectively. The positive pressure pipeline and the negative pressure pipeline are provided with an electromagnetic valve, respectively. A control module controls the operation of the compressor and the on/off of the electromagnetic valves in the positive pressure pipeline and the negative pressure pipeline. This automatically detects positive pressure and negative pressure of the compressor.

6 Claims, 8 Drawing Sheets

COMPRESSOR PRESSURE MEASURING DEVICE

BACKGROUND OF THE INVENTION

1. Field of Invention

The invention relates to a compressor pressure measuring device and, in particular, to a compressor pressure measuring device that automatically detects positive pressure and negative pressure of the compressor.

2. Related Art

Normally, after a compressor is assembled, one has to perform a positive and negative pressure test in order to determine whether the output pressure thereof reaches the predetermined value and to determine whether there is any internal leakage.

Figure 8:
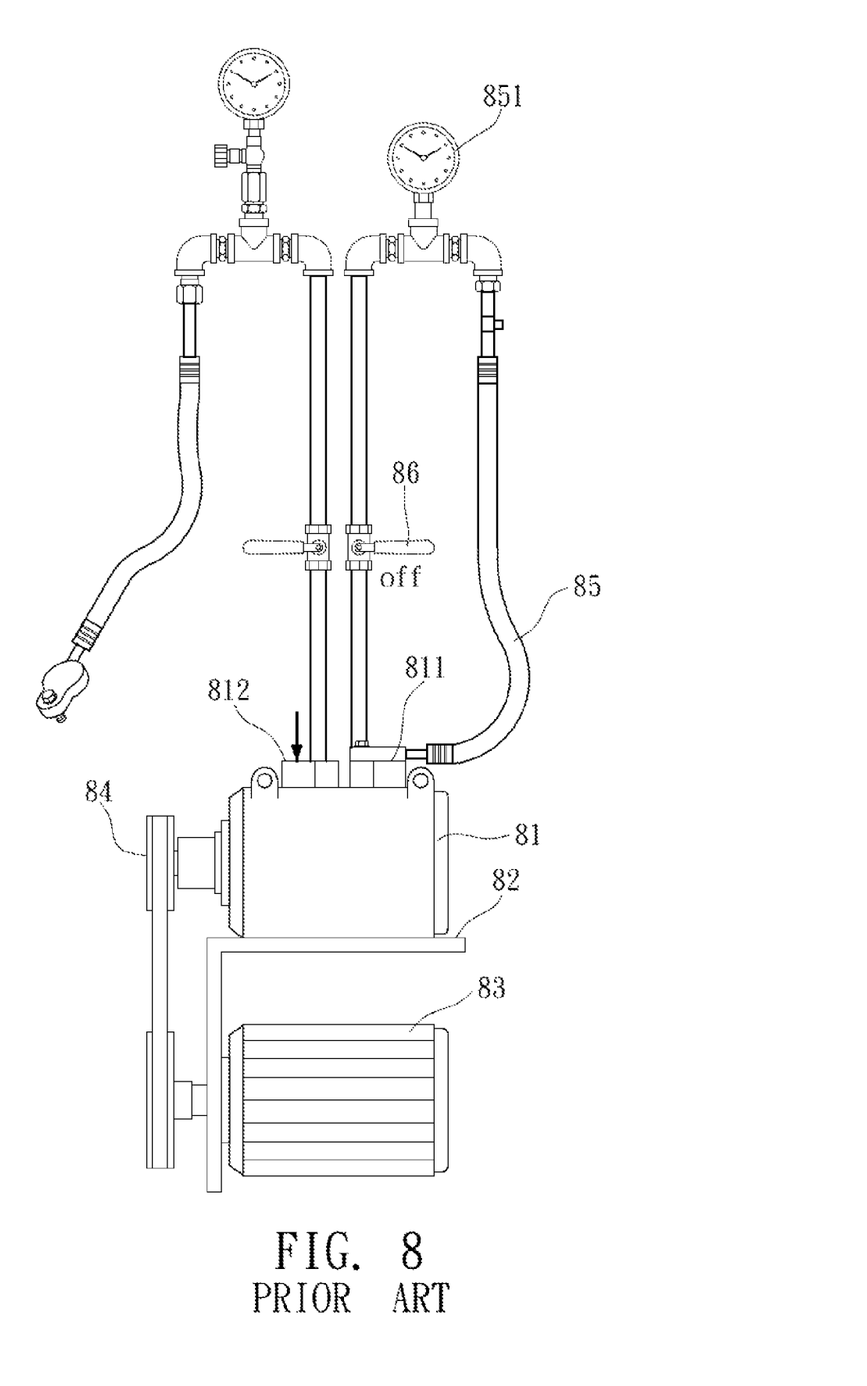
FIG. 8 is a schematic view of a positive pressure test using a conventional compressor pressure measuring device.

As shown in FIG. 8, the conventional compressor testing method first puts the compressor 81 to be tested on a working platform 82. The transmission axle of the compressor 81 has a belt wheel 84 driven by a motor 83. This drives the compressor 81 for a test run. To test the positive pressure, one end of a positive pressure pipeline 85 is connected to the output end 811 of the compressor 81. The input end of the compressor 81 is injected with an appropriate test fluid. One then starts the motor 83 to perform the test run for the compressor 81. In this case, a switch 86 is toggled to close the other end of the positive pressure pipeline 85. One can then read the output positive pressure of the compressor 81 from the gauge 851 on the positive pressure pipeline 85. After the positive pressure test, one manually toggle the switch 86 so that the test fluid in the positive pressure pipeline 85 flows from the other end of the positive pressure pipeline 85 into a recycle bucket (not shown).

Figure 9:
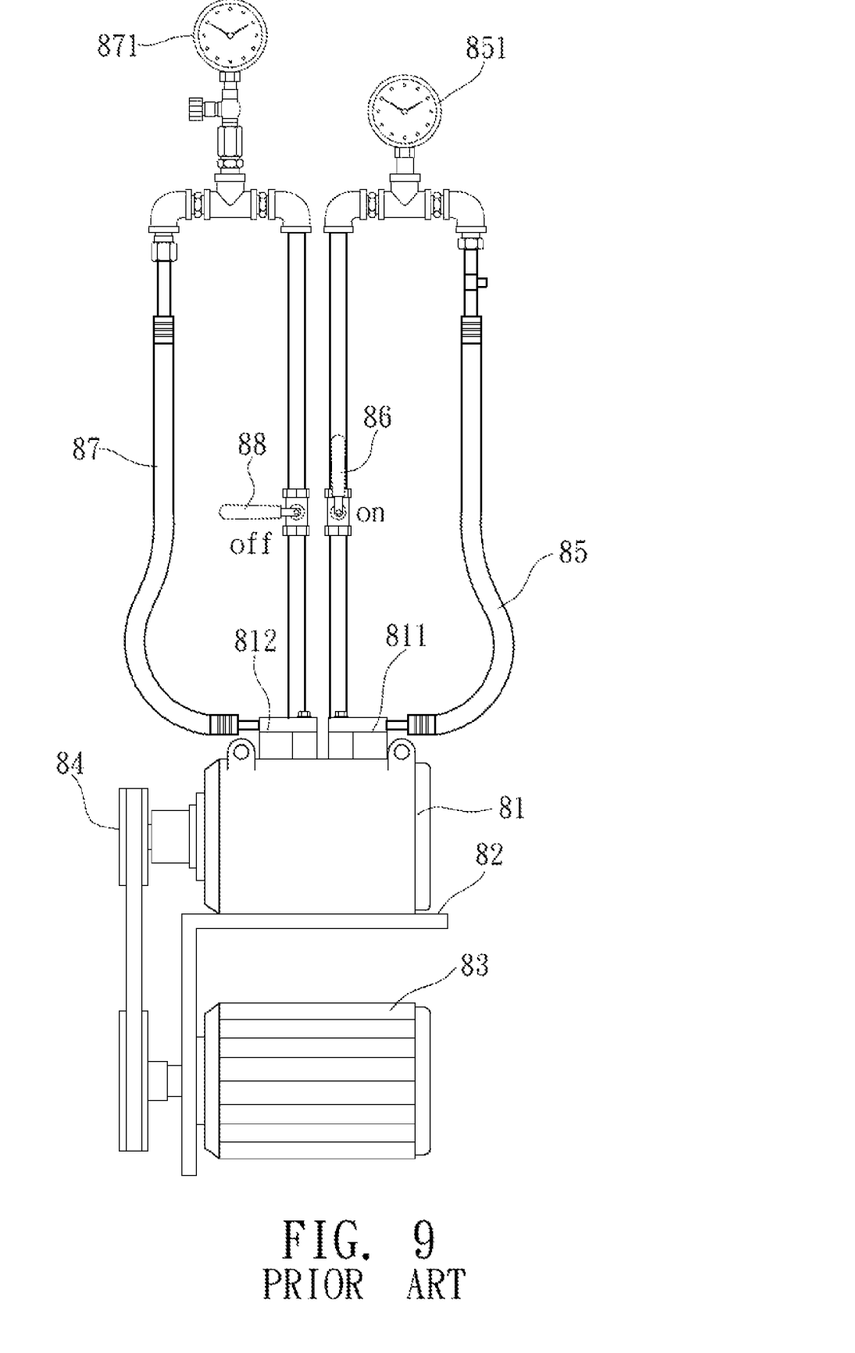
FIG. 9 is a schematic view of a negative pressure test using a conventional compressor pressure measuring device.

To perform the negative pressure test, as shown in FIG. 9, one end of a negative pipeline 87 is connected to the input end 812 of the compressor 11. One then starts the motor 83 to drive the compressor 81 for a test run. Another switch 88 in the negative pressure pipeline 87 is toggled so that the other end thereof is closed. The switch 86 of the positive pressure pipeline 85 is toggled on. One can then read the negative pressure on the input end 812 of the compressor 81 from the gauge 871 on the negative pressure pipeline 87. This value is used to determine whether there is any internal leakage in the compressor.

However, the above-mentioned conventional compressor testing method is completely manual, including the assembly of the belt wheel 84, the toggles of the switches 86, 88, and the judgments based on the pressure values. Not only is the entire testing procedure too time- and manpower-consuming, it is also likely to involve human errors.

SUMMARY OF THE INVENTION

An objective of the invention is to provide a compressor pressure measuring device that can automatically test the positive and negative pressure of the compressor, effectively saving manpower costs and shortening test time.

Another objective of the invention is to provide a compressor pressure measuring device that automatically determines whether the measured pressure value is normal, thereby increasing the accuracy in compressor tests.

To achieve the above-mentioned objectives, the compressor pressure measuring device connects to the entry end and exit end of a compressor. It drives the transmission axle of the compressor to run for a pressure test. The disclosed compressor pressure measuring device includes: a platform, a tool, a positive pressure pipeline, a negative pressure pipeline, and a control module.

The platform has a holder for holding a compressor. The tool has an inner tooth hole for the insertion and connection of the transmission axle of the compressor. The tool is driven by a motor so that the connected compressor can be driven to run.

One end of the positive pressure pipeline has a connector corresponding to the exit end of the compressor. The other end thereof connects to a recycle bucket. The positive pressure pipeline has a first electromagnetic (EM) valve for controlling its connection state. A positive pressure test area is formed between the first quick-release connector and the first EM valve in the positive pressure pipeline. A positive pressure gauge is disposed in the positive pressure test area.

One end of the negative pressure pipeline has another connector corresponding to the entry end of the compressor. The other end thereof connects to a test fluid container. The negative pressure pipeline has a second EM valve for controlling whether the test fluid container or external air is in fluid communications with the negative pressure pipeline. A negative pressure test area is formed between the quick-release connector and the second EM valve in the negative pressure pipeline. A negative pressure gauge is disposed in the negative pressure test area.

The control module has several indicators electrically connected with the motor, the first EM valve, the second EM valve, and the positive and negative pressure gauges for controlling the on/off of the motor, the first EM valve, and the second EM valve. This enables the invention to automatically test the positive pressure or negative pressure of the compressor. The control module has default positive and negative pressure values. The control module compares the values measured by the positive and negative pressure gauges with the default positive and negative pressure values, and uses the indicators thereon to show the comparison result.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
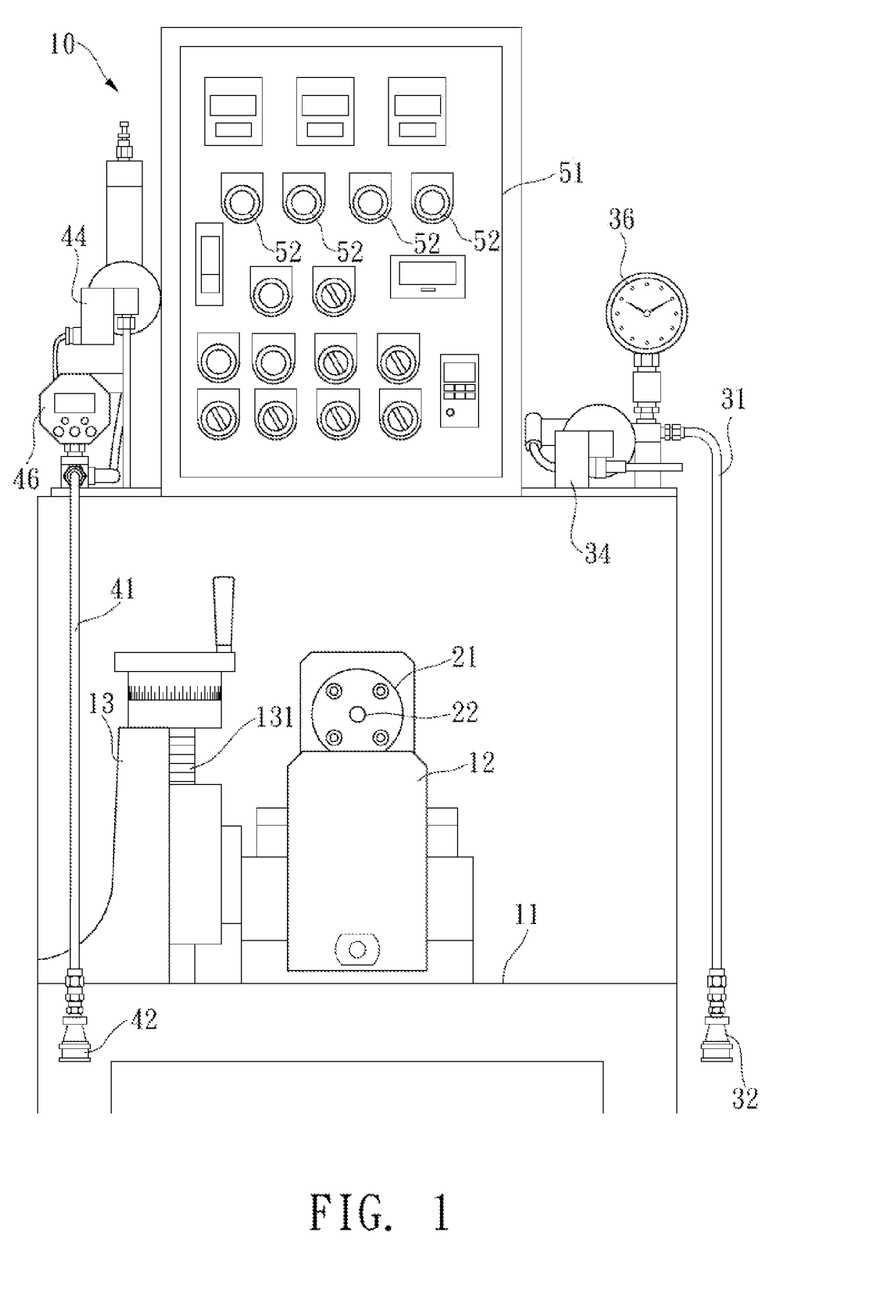
FIG. 1 is a schematic view of the structure of the invention.
Figure 2:
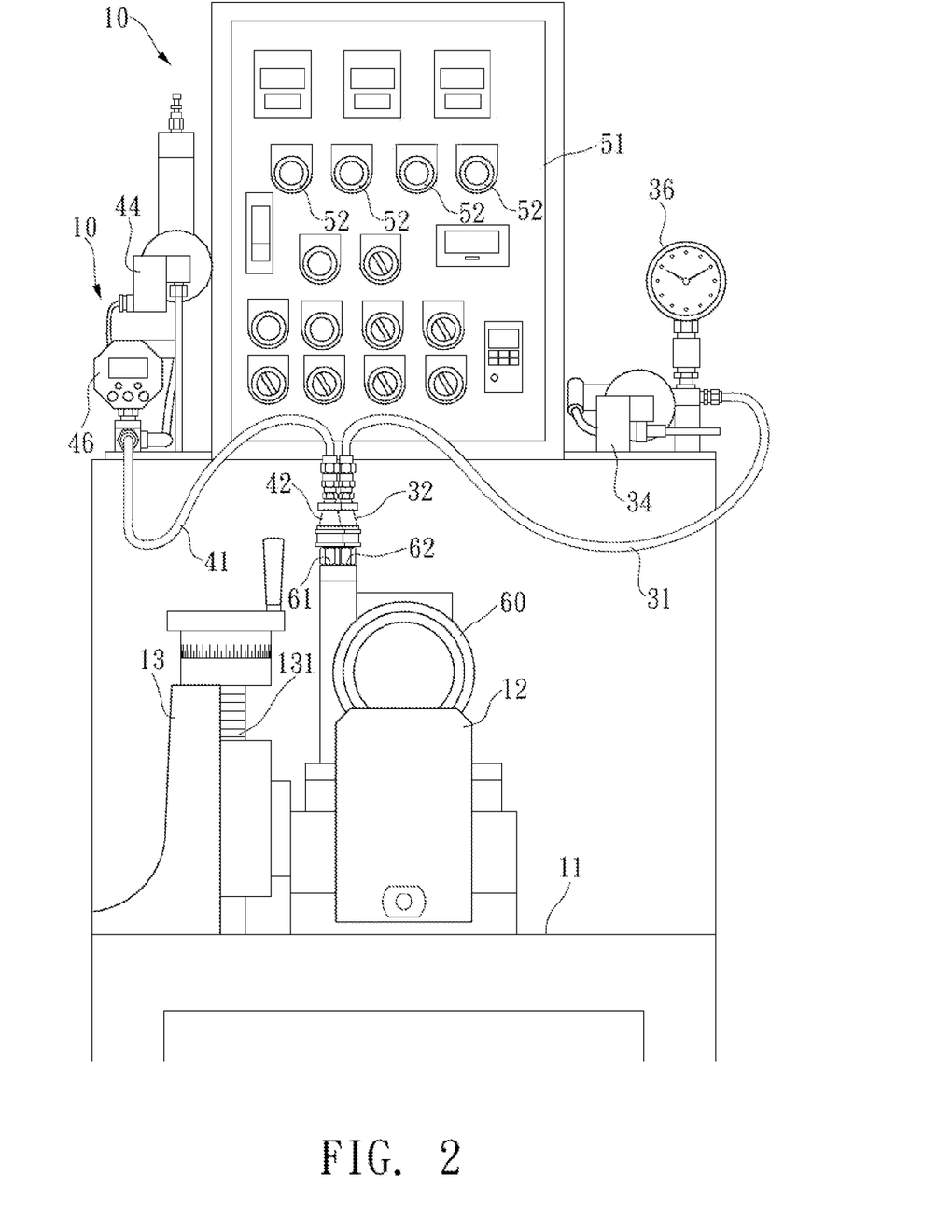
FIG. 2 shows the usage of the invention.
Figure 3:
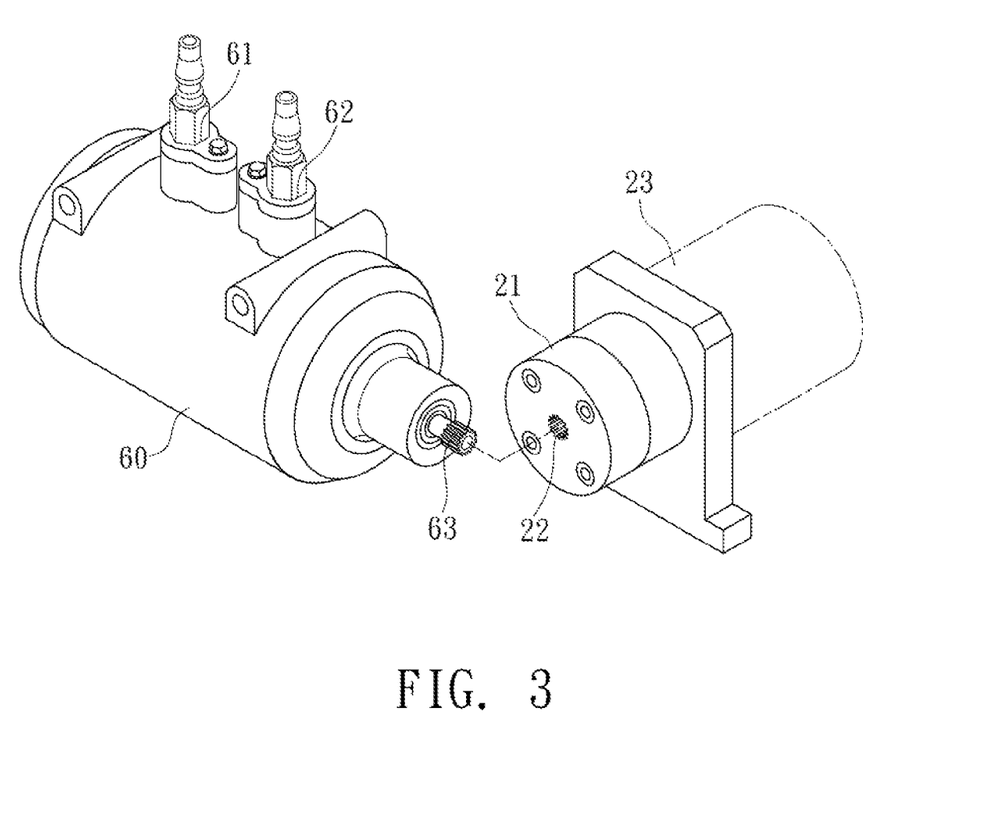
FIG. 3 is a schematic view showing the disclosed tool and the transmission axle of a compressor are connected.

Please refer to FIGS. 1 to 3. The disclosed compressor pressure measuring device 10 connects to the entry end 61 and the exit end 62 of a compressor 60. It can drive the transmission axle 63 of the compressor 60 to perform a pressure test. The compressor pressure measuring device 10 includes: a platform 11, a tool 21, a positive pressure pipeline 31, a negative pipeline 41, and a control module 51.

The platform 11 has a holder 12 for holding the compressor 60. The holder 12 has an elevating mechanism 13. In this embodiment, the elevating mechanism 13 has a sliding rail 131 vertically extending toward the platform 11. The holder 12 is installed on the sliding rail 131 of the elevating mechanism 13 to slide up and downs along the sliding rail 131.

The tool 21 has an inner tooth hole 22 for the insertion and connection of the transmission axle 63 of the compressor 60. The tool 21 is driven by a motor 23 to concurrently drive the connected compressor 60 for a test run.

The positive pressure pipeline 31 consists of a flexible soft pipe. Its one end has a first quick-release connector 32 corresponding to the exit end 62 of the compressor 60. The other end of the positive pressure pipeline 31 connects to a recycle bucket 33. The positive pressure pipeline 31 has a first EM valve 34 for controlling its connection state. A positive pressure test area 35 is formed between the first quick-release connector 32 and the first EM valve 34 in the positive pressure pipeline 31. A positive pressure gauge 36 is disposed in the positive pressure test area 35.

One end of the negative pressure pipeline 41 has a second quick-release connector 42 corresponding to the entry end 61 of the compressor 60. The other end of the negative pressure pipeline 41 connects to a test fluid container 43. The negative pressure pipeline 41 has a second EM valve 44 for controlling whether the test fluid container 43 or external air is in fluid communications with the negative pressure pipeline 41. A negative pressure test area 45 is formed between the second quick-release connector 42 and the second EM valve 44 in the negative pressure pipeline 41. A negative pressure gauge 46 is disposed in the negative pressure test area 41.

The control module 51 has several indicators 52 electrically connected with the motor 23, the first EM valve 34, the second EM valve 44, and the positive and negative pressure gauges 36, 46 for controlling the on/off of the motor 23, the first EM valve 34, and the second EM valve 44. This enables the invention to automatically test the positive pressure or negative pressure of the compressor 60. The control module 51 has default positive and negative pressure values. The control module 51 compares the values measured by the positive and negative pressure gauges 36, 46 with the default positive and negative pressure values, and uses the indicators 52 on the control module 51 to show the comparison result.

Figure 4:
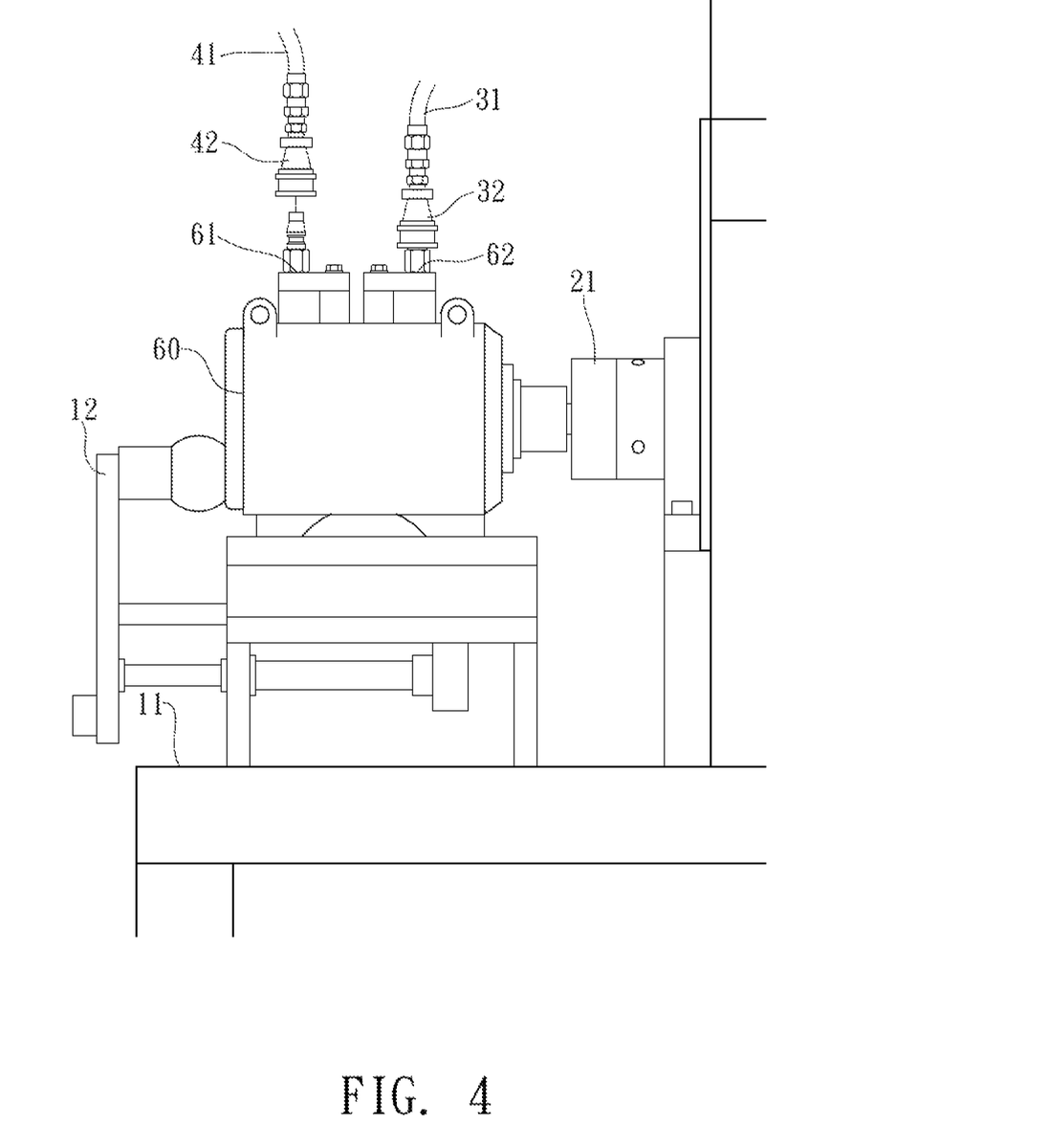
FIG. 4 is a schematic view showing the connection between the positive and negative pressure pipelines and the transmission axle of the compressor.

To further elucidate the features in the disclosed structure, the technical means of the invention, and the achieved effects, the usage of the invention is described below:

Before automatically testing the positive and negative pressures of the compressor, the invention first sets the positive and negative pressure values in the control module 51. In this embodiment, the positive pressure value is set at 200 psi, and the negative pressure value is set between 760 and 435 mmHG. As shown in FIG. 3, the compressor 60 to be tested is put in the holder 12 of the platform 11. The transmission axle 63 of the compressor 60 aligns with the inner tooth hole 22 of the tool 21. The user can change the tool 21 according to the size and specifications of the compressor 60. The elevating mechanism 13 is used to adjust the position of the compressor 60 and then fastened. Afterwards, as shown in FIG. 4, the positive and negative pressure pipelines 31, 41 are connected to the entry end 61 and the exit end 62 of the compressor 60. This finishes the preparation for positive and negative pressure tests of the compressor.

Figure 5:
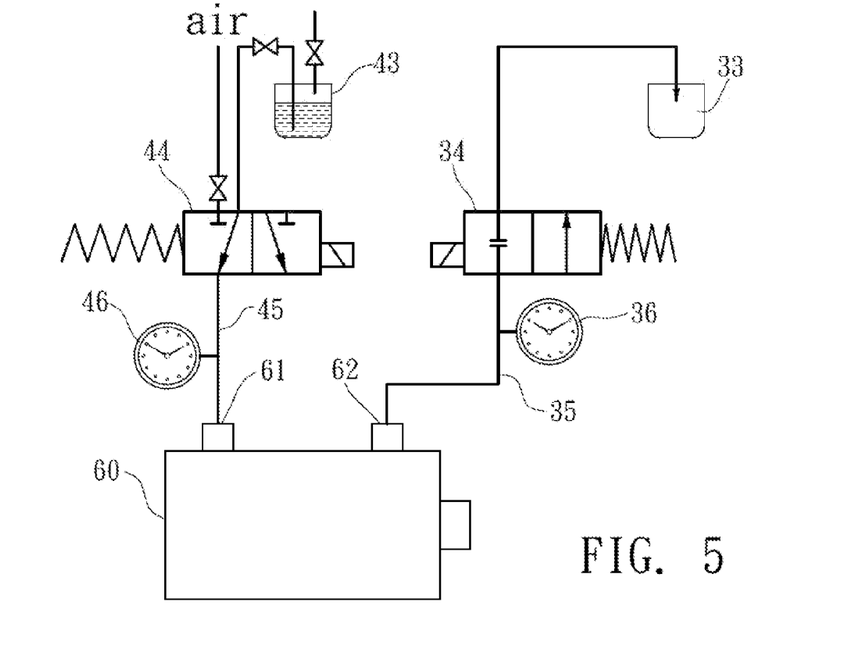
FIG. 5 is a schematic view of flowing path for the positive pressure test.
Figure 6:
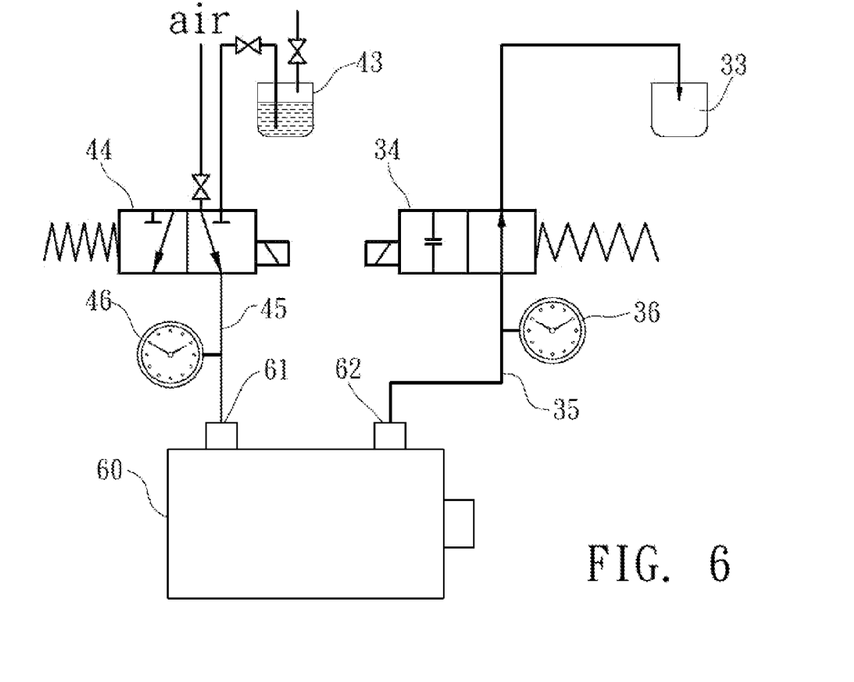
FIG. 6 is a schematic view of flowing path when the positive pressure test is over.

When the motor 23 is started to drive the tool 21 and the connected compressor 60 for a positive pressure test, as shown in FIG. 5, the control module 51 closes the first EM valve 34. The second control valve 44 is open to connect with the test fluid container 43. In this case, the test fluid in the test fluid container 43 flows into the compressor 60. Through the action of the compressor 60, the test fluid enters the positive pressure test area 35 in the positive pressure pipeline 31 via the exit end 62. When the positive pressure gauge 36 of the positive pressure test area 35 reaches 200 psi, the control module 51 automatically determines that the positive pressure is normal and outputs a control signal for the corresponding indicator 52 thereon to light up. If the positive pressure gauge 36 does not reach 200 psi, the control module 51 automatically determines that the positive pressure is abnormal and outputs another control signal to light up the corresponding indicator 52. After testing the positive pressure of the compressor, as shown in FIG. 6, the control module 51 stops the operation of the motor 23 and opens the first EM valve 34. The second control valve 44 closes the test fluid container 43. The test fluid in the positive pressure test area 35 can thus flow into the recycle bucket 33 via the other end of the positive pressure pipeline 31.

Figure 7:
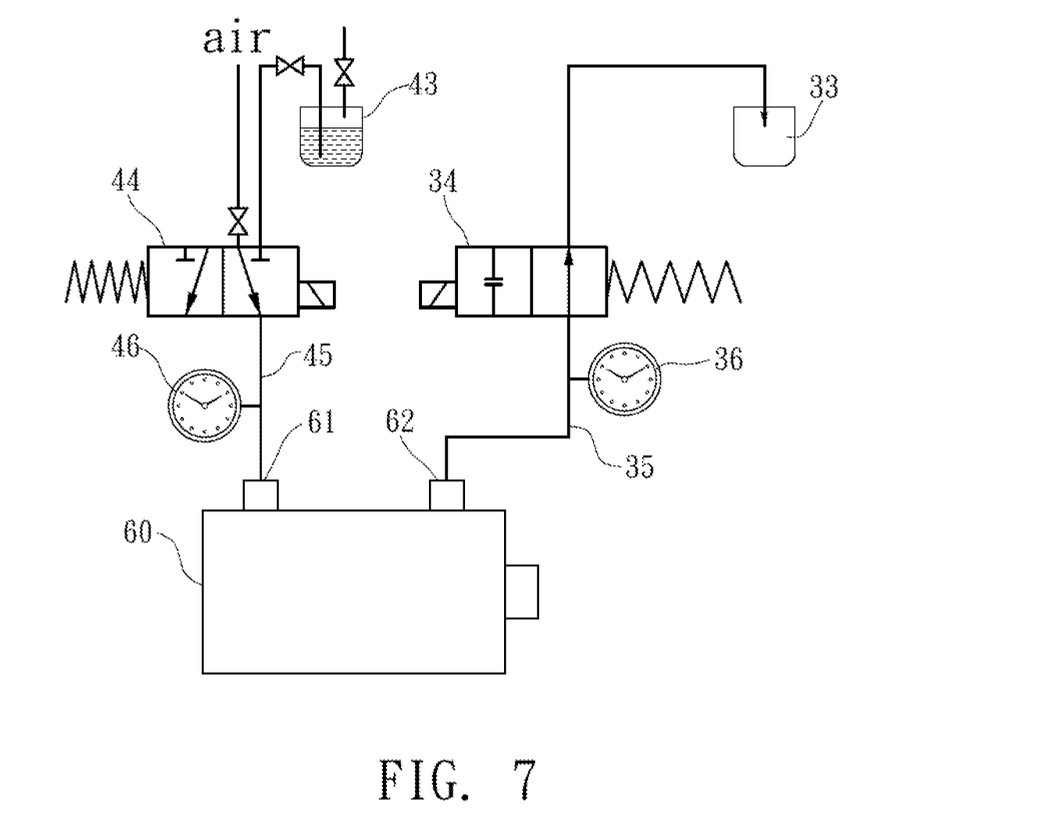
FIG. 7 is a schematic view of flowing path for the negative pressure test.

When the motor 23 is started to drive the tool 21 and the connected compressor 60 for a negative pressure test, as shown in FIG. 7, the control module 51 opens the first EM valve 34. The second control valve 44 closes the test fluid container 43. If the value measured by the negative pressure gauge 46 is between 760 and 435 mmHG and the negative pressure does not drop within a predetermined time, then the control module 51 automatically determines that the negative pressure is normal and outputs a control signal to light up the indicator 52 thereon. If the value measured by the negative pressure gauge 46 is not between 760 and 435 mmHG or the negative pressure is detected to drop within a predetermined time, the control module 51 automatically determines that the negative pressure is abnormal and outputs another control signal to light up the corresponding indicator 52.

According to the above description, the invention has the following advantages:

1. During the installation of a compressor 60 onto the invention, the user only needs to align the transmission axle 63 of the compressor 60 with the inner tooth hole 22 of the tool 21. The holder 12 then fixes the position thereof. With the quick-release connectors 32, 42 of the positive and negative pressure pipelines 31, 41, the entry end 61 and the exit end 62 of the compressor 60 can be quickly connected. Therefore, it is fairly simple and quick to install the compressor 60.

2. The disclosed compressor pressure measuring device 10 can replace the tool 21 according to the size and specifications of the compressor 60. The position of the compressor 60 is adjusted by the elevating mechanism 13 for the connection to the inner tooth hole 22 of the tool 12. Therefore, the disclosed compressor pressure measuring device 10 can be used for pressure tests on compressors of all specifications.

3. The compressor pressure measuring device 10 has default positive and negative pressure values in the control module 51. The control module 51 automatically compares the values measured by the positive and negative pressure gauges with the default positive and negative pressure values, and uses the indicators 52 thereon to show the comparison result. The user can quickly know the pressure test result. This prevents possible human errors and thus greatly increases the accuracy of the compressor test tasks.

4. The compressor pressure measuring device 10 can automatically test the positive and negative pressures of the compressor 60. This saves the cost for manpower and effectively shortens the testing time.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A compressor pressure measuring device for connecting to an entry end and an exit end of a compressor and driving a transmission axle of the compressor for a pressure test, the compressor pressure measuring device comprising:
    a platform having a holder for holding the compressor;
    a tool having an inner tooth hole for the insertion and connection of the transmission axle of the compressor, driven by a motor to drive the connected compressor into operation;
    a positive pressure pipeline, whose one end has a first connector corresponding to the exit end of the compressor and whose other end connects to a recycle bucket, having a first electromagnetic (EM) valve for controlling the connection state thereof, and having a positive pressure test area formed between the first connector and the first EM valve to accommodate a positive pressure gauge;
    a negative pressure pipeline, whose one end has a second connector corresponding to the entry end of the compressor and whose other end connects to a test fluid container, having a second EM valve for controlling whether the negative pressure pipeline is in fluid communication with the test fluid container or external air, and having a negative pressure test area formed between the second connector and the second EM valve to accommodate a negative pressure gauge; and
    a control module having a plurality of indicators electrically connected with the motor, the first EM valve, the second EM valve, and the positive and negative pressure gauges and controlling the on/off of the motor, the first EM valve, and the second EM valve for automatically testing the positive and negative pressures of the compressor;
    wherein the control module has default positive and negative pressure values, the control module compares the values measured by the positive and negative pressure gauges with the default positive and negative pressure values, and uses the indicators thereon to show the comparison result.

2. The compressor pressure measuring device of claim 1, wherein the holder connects to an elevating mechanism having a sliding rail extending vertically toward the platform, and the holder is installed on the sliding rail of the elevating mechanism to slide thereon.

3. The compressor pressure measuring device of claim 1, wherein the connectors on the positive and negative pressure pipelines for the connections with the entry end and the exit end of the compressor are quick-release connectors.

4. The compressor pressure measuring device of claim 1, wherein the positive and negative pressure pipelines are connected to the entry end and exit end of the compressor, respectively; when the motor starts to drive the connected compressor for a positive pressure test, the control module closes the first EM valve, the second control valve opens the connection with the test fluid container, and the test fluid therein flows via the negative pressure pipeline into the compressor; through the action of the compressor, the test fluid enters the positive pressure test area in the positive pressure pipeline via the exit end of the compressor; when the positive pressure measured by the positive pressure gauge in the positive pressure test area is equal to the default positive pressure value of the control module, the control module automatically determines that the positive pressure is normal and outputs a control signal to light up a corresponding indicator thereon; when the positive pressure measured by the positive pressure gauge is not equal to the default positive pressure value, the control module automatically determines that the positive pressure is abnormal and outputs another control signal to light up a corresponding indicator thereon.

5. The compressor pressure measuring device of claim 4, wherein after the positive pressure test is done the control module immediately stops the operation of the motor and turns on the first EM valve, and the second control valve closes the test fluid container so that the test fluid in the positive pressure test area flows via the other end of the positive pressure pipeline into the recycle bucket.

6. The compressor pressure measuring device of claim 1, wherein the positive and negative pressure pipelines are connected to the entry end and exit end of the compressor, respectively; when the motor starts to drive the connected compressor for a negative pressure test, the control module opens the first EM valve and the second control valve closes the connection with the test fluid container; when the negative pressure measured by the negative pressure gauge falls in the negative pressure range set by the control module and does not drop within a predetermined time, the control module automatically determines that the negative pressure is normal and outputs a control signal to light up a corresponding indicator thereon; when the negative pressure measured by the negative pressure gauge does not fall in the negative pressure range set by the control module or drops within a predetermined time, the control module automatically determines that the negative pressure is abnormal and outputs another control signal to light up a corresponding indicator thereon.

* * * * *